Patented Mar. 23, 1926.

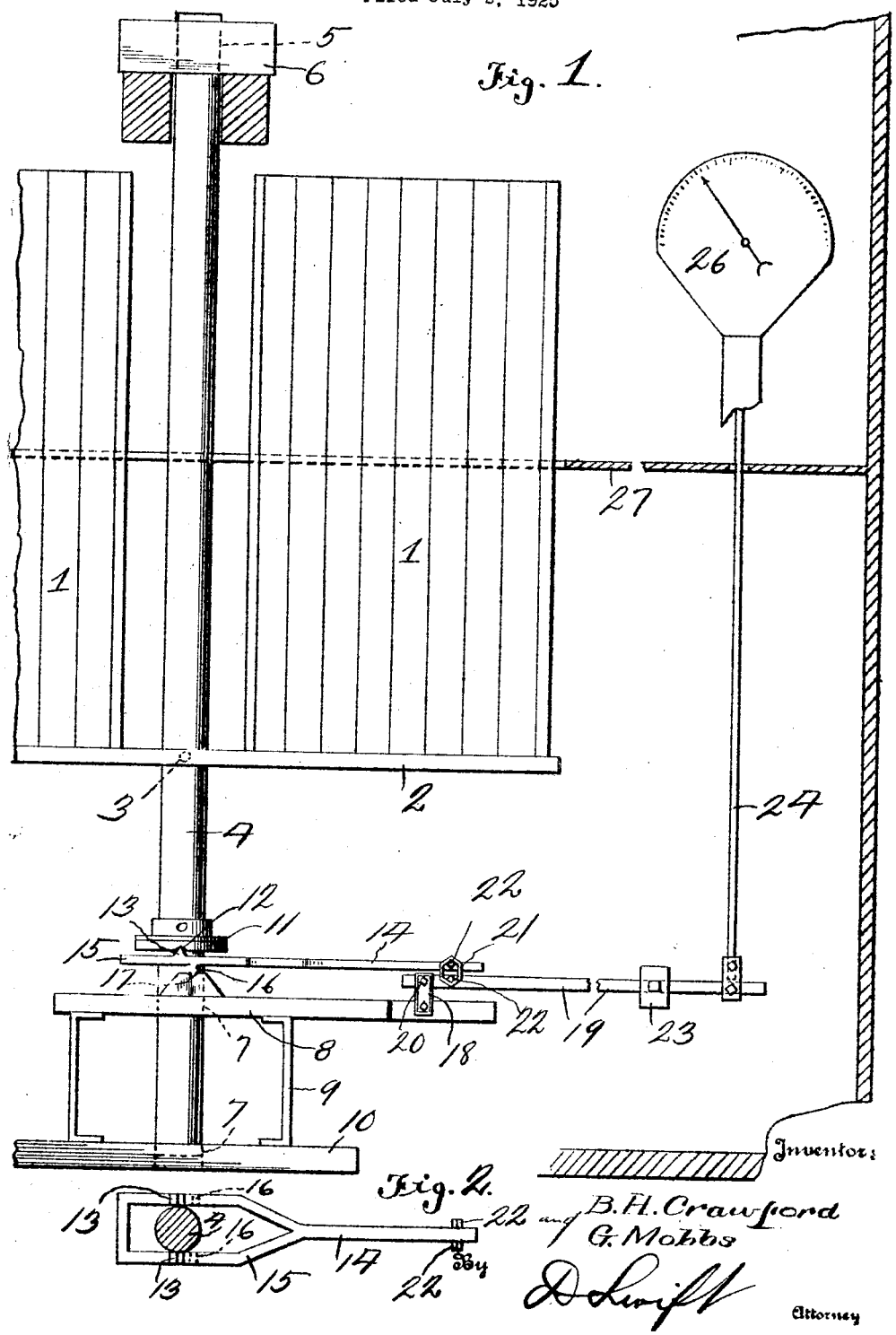

1,577,956

UNITED STATES PATENT OFFICE.

BUSH H. CRAWFORD AND GEORGE MOBBS, OF LITTLE ROCK, ARKANSAS.

COTTON-BALE-WEIGHING DEVICE.

Application filed July 2, 1925. Serial No. 41,091.

*To all whom it may concern:*

Be it known that we, BUSH H. CRAWFORD and GEORGE MOBBS, citizens of the United States, residing at Little Rock, in the county of Pulaski, State of Arkansas, have invented a new and useful Cotton-Bale-Weighing Device; and we do hereby declare the following to be a full, clear, and exact description of the invention, such as will enable others skilled in the art to which it appertains to make and use the same.

The invention relates to weighing devices, for weighing cotton bales, and has for its object to provide weighing means in connection with a cotton bale press whereby the amount of cotton in the press may be accurately determined, thereby allowing the formation of bales of cotton of uniform weight.

A further object is to provide a scale in connection with a cotton press, which scale may be disposed on the first or second floor of a building if desired.

A further object is to provide, in connection with a vertically movable press supporting shaft cooperating rockable scale levers, one of which levers cooperates with a weight indicating device. Also to provide one of the levers with an adjustable weight for counterbalancing the press when empty thereby allowing the true weight of cotton within the press to be accurately indicated.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a sectional view through a portion of a building, showing a conventional form of cotton bale press in front elevation and the weighing device applied thereto.

Figure 2 is a horizontal sectional view through the press supporting shaft, showing one of the levers in plan view.

Referring to the drawing, the numeral 1 designates adjacent cotton bale casings, in which cotton bales are formed in the usual manner. The casings 1 are disposed on a horizontally disposed platform 2, to which is secured at 3 a vertically disposed supporting shaft 4. Supporting shaft 4 is slidably mounted in a bearing 5 of a support 6 at its upper end and in spaced bearings 7 carried by the upper platform 8 of the base 9, and the lower platform 10 of said base. It will be noted that when cotton is placed in the baler casings 1 the shaft will move downwardly and by counterbalancing the shaft 4 through weighing means, the amount of cotton within the casings 1 may be easily ascertained during the filling and pressing operation, thereby allowing cotton bales of uniform weight to be formed.

Secured to the shaft 4 adjacent the base 9 is a horizontally disposed disc 11, the underside of which is provided with V-shaped recesses 12, which receive the upwardly extending V-shaped lugs 13 carried by the scale beam section 14. Scale beam section 14 is provided with a yoke 15 which surrounds the shaft 4, and its under side is provided with downwardly extending V-shaped lugs 16 which are rockably mounted in recesses 17 carried by the upper platform 8 of the base, therefore it will be seen as the shaft 4 is forced downwardly incident to the accumulated weight of material in the baler casings 1, the beam section 14 will be rocked. Extending upwardly from the platform 8 are spaced links 18, between which is pivotally connected the inner end of the beam section 19 at 20, and which beam section has a relatively long leverage on the beam section 14 by means of the yoke 21 in which the lugs 22 are rockably disposed, therefore it will be seen a considerable weight may be placed in the baler casings 1 before the counterbalancing operation. Beam section 19 has adjustably mounted thereon a counter balancing weight 23 which is adapted to be adjusted to counterweight the casings 1 when they are empty. When material is placed in the casings 1 or in either casing, the beam section 19 is rocked upwardly at its outer end, according to the amount of material within the casing, thereby forcing upwardly on a scale actuating rod 24 which may extend upwardly through a floor of a building to a conventional form of indicating scale 26 located above the second floor 27 of the building, therefore it will be seen that the operator of the baler may easily and quickly ascertain the amount of material in the casings and the approximate weight of a bale of cotton when formed. Although the weighing device 26 is shown located on a second floor of a building, it is obvious that it may be located in any other suitable position, for instance on the first floor to one side of the machine.

The invention having been set forth what is claimed as new and useful is:—

The combination with a vertically movable cotton baling press supporting shaft, of a weighing device, said weighing device comprising a balancing beam, said beam being formed from two sections, a yoke carried by one of the beam sections and surrounding the shaft, upwardly extending balancing lugs carried by said yoke, a flanged member carried by the press shaft and provided with recesses for the reception of the upwardly extending lugs, a base in which the shaft is slidably mounted, lugs carried by the yoke and rockably mounted on the base, rockable connections between the beam sections, the outer beam sections being pivotally connected to the base, a counterweight on said last named beam section, a weight indicating device and connections between the last named beam section and the weight indicating device.

In testimony whereof we have signed our names to this specification.

BUSH H. CRAWFORD.
GEO. MOBBS.